United States Patent [19]

Matthew

[11] Patent Number: 4,462,900

[45] Date of Patent: Jul. 31, 1984

[54] CENTRIFUGAL PULP SCREENING DEVICE AND METHOD

[75] Inventor: John B. Matthew, Pittsfield, Mass.

[73] Assignee: Beloit Corporation, Beloit, Wis.

[21] Appl. No.: 399,111

[22] Filed: Jul. 16, 1982

[51] Int. Cl.³ .............................................. B07B 1/22
[52] U.S. Cl. .................................. 209/243; 209/270; 209/273; 210/456
[58] Field of Search ............... 209/243, 250, 273, 305, 209/270; 210/456; 162/60

[56] References Cited

U.S. PATENT DOCUMENTS

| | | | |
|---|---|---|---|
| 2,782,897 | 2/1957 | Derrick, Jr. | 209/250 |
| 3,247,965 | 4/1966 | Braun | 209/240 |
| 3,276,584 | 10/1966 | Mathewson | 209/243 |
| 3,280,981 | 10/1966 | Renfren | 210/456 |
| 4,238,324 | 12/1980 | Musslemann et al. | 209/273 |

FOREIGN PATENT DOCUMENTS 939949 10/1963 United Kingdom ............... 210/456

Primary Examiner—David L. Lacey
Attorney, Agent, or Firm—Hill, Van Santen, Steadman & Simpson

[57] ABSTRACT

A centrifugal pulp screen device including a perforate wall cylindrical screen, an outer enclosing housing, a centrally located stock supply conduit and a distributor for the stock including an annular distribution slice opening having a fixed lower lip and movable upper lip with the slice discharging against fixed angular vanes which direct the stock in a spiralling centrifugal flow along the inner surface of the screen with the volume of flow controlled by adjustment of the slice opening and the velocity controlled by a variable delivery supply pump and the velocity affecting the spiralling centrifugal action by impact of the stock against the vanes. A corresponding method for screening the stock is also disclosed.

13 Claims, 3 Drawing Figures

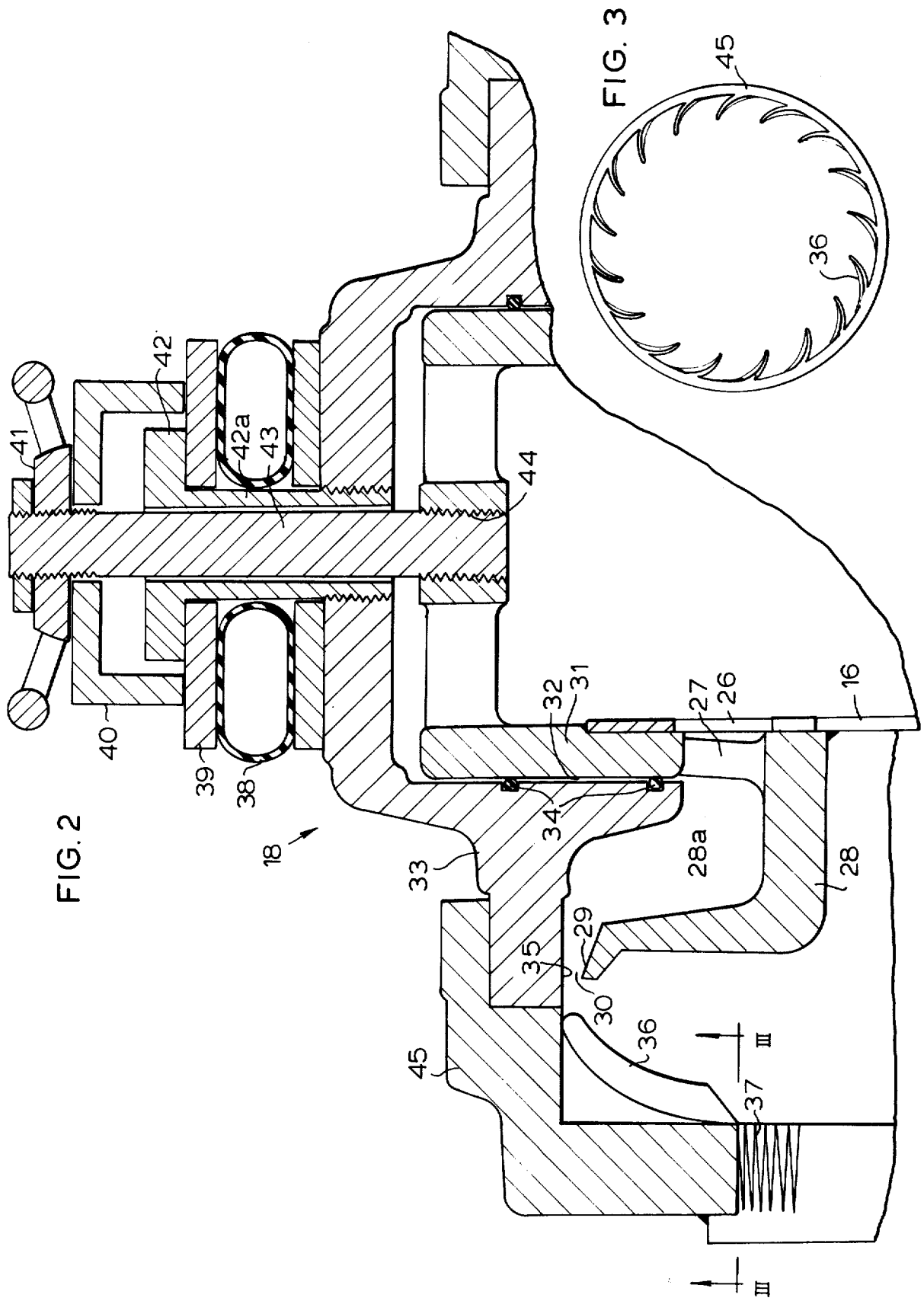

CENTRIFUGAL PULP SCREENING DEVICE AND METHOD

BACKGROUND OF THE INVENTION

The present invention relates to improvements in screening devices for screening papermaking pulp fibers, and more particularly to an improved vertical centrifugal screen for pulp stock.

In the screening of pulp fibers, it is desirable to separate the fibers into their individual discrete form. The stock as fed to screens normally contains varying amounts of splinters and fiber bundles, and it is the primarly purpose of the screening operation to remove such undesirable coarse material so that a uniformly clean stock is available for the papermaking machine. While the problem of obtaining clean stock exists for all types of fibers, it is especially troublesome with groundwood fibers. Other types of screening devices include horizontal and vertical screens, although the present invention pertains particularly to a vertical centrigual screen wherein the stock is fed to the center of a screen, and the accepts, or acceptable fibers pass through openings in the screen to be collected in a housing surrounding the screen, and the rejects including splinters, fiber bundles, sheaves, particles of dirt and bark, are retained within the screen and pass out through a reject opening in the housing.

In vertical screens of the type to which the present improvements apply, it is important that continuous operation be achieved without plugging or impeding the continual screening flow of stock through the screen. It is also important to the device that a regulatable control of flow be achieved with structure of uncomplicated design and relatively easy to control. Centrifugal screens of the type described herein are usable in other industries, but the present invention finds particular advantage in the papermaking industry and will be described in connection with the screening of paper pulp. The present invention presents an improvement over screens heretofore used in providing a lower cost per unit of volume processed and requiring less space for installation. It also provides a structure which is more convenient for operation, particularly with respect to adjustment of the jet opening which controls the rate of flow of stock through the screening mechanism.

It is accordingly an object of the present invention to provide an improved structure for a centrifugal screen for screening paper pulp.

A further object of the invention is to provide an improved screen which will increase the screening flow through and will provide an improved resultant product, and which achieves an improved centrifugal effect without having to drive the screen or other parts in rotation.

In accordance with the principles of the present invention, a circumferential slice opening is provided which delivers a continuous radial jet at one end of the cylindrical screen and the radial velocity of the jet can be controlled by varying the pressure in the inlet chamber. The volume of flow can be controlled by varying the slice opening. The jet which emerges radially from the slice is then redirected downwardly and at the same time given a slight tangential component of velocity by unique deflector vanes. This results in a spiral flow of the liquid along the inner surface of the cylindrical screen. The centrifugal force which is determined by combined effects of jet velocity, spiral angle and basket diameter, cause dewatering or screening of the stock to occur. It is unnecessary to encounter the expense of a construction which provides for supports and power drive in rotation. Depending on the size of the openings in the cylindrical screen, particles whose size exceed a certain limit will be retained and will eventually fall off the screen surface to be collected in a coarse fraction compartment. Most of the liquid and small particles which pass through the screen are collected in a fine fraction compartment. The design of the structure is such that it accomplishes a low manufacturing cost, and the structure provides that the piping which is supported by collection compartments provides the mechanical support for the inlet chamber. Machining including turning and boring is required on a minimum number of components which comprise the head assembly, and the remainder of the machine includes standard pipe fittings and simple stainless steel fabrications.

Other objects, advantages and features will be become more apparent with the teaching of the principles of the invention in connection with the disclosure of the preferred embodiment thereof in the specification, claims and drawings, in which:

DESCRIPTION OF THE DRAWINGS

FIG. 2 is an enlarged more detailed vertical sectional view of the head end of the structure; and FIG. 3 is a somewhat schematic horizontal sectional view taken substantially along line III—III of FIG. 2.

DESCRIPTION OF THE MECHANISM

Figure 1:
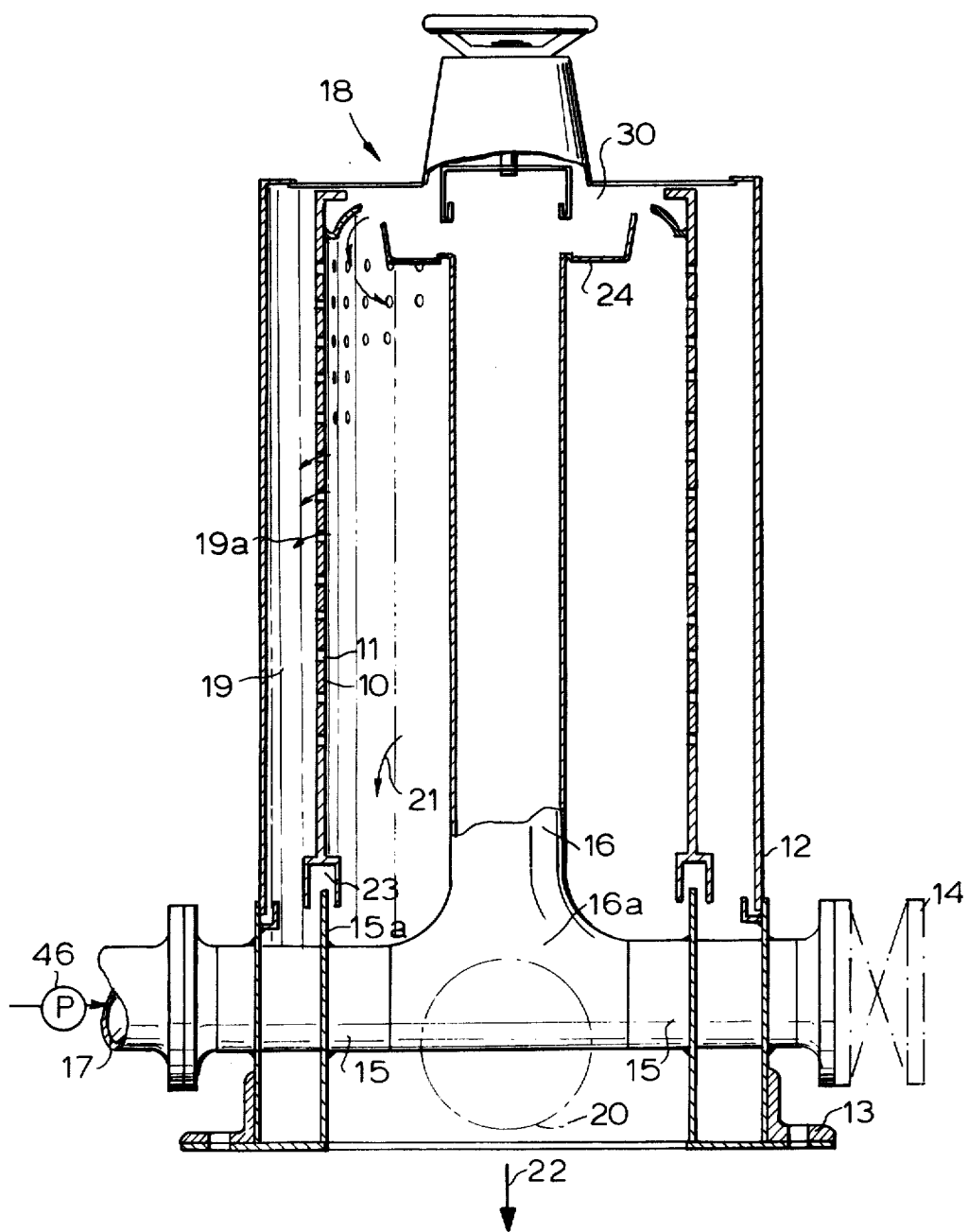
FIG. 1 is somewhat schematic view, shown in vertical section of a centrifugal screening device embodying the principles of the present invention.

As shown in FIG. 1, a fractionating or scalping screen mechanism is provided having a cylindrical rotatable screen 10 with screening perforations or openings 11 therethrough. Stock which flows from the upper end of the screen toward the lower end is given a controlled centrifugal flow, and the accepts or suitable fibers pass through the openings while the dirt, fibers bundles and sheaves and other objectionable material remain within the screen passing down toward the lower end.

The rotatable cylindrical screen 10 is enclosed in a housing 12 so as to provide an annular space 19 between the screen and housing where the accepts flow downwardly and out of the housing through a fines fraction conduit at a base 13 of the housing. An annular stationary shell 15a in the base of the housing provides a continuation of the annular space 19 for the fines which space communicates with the outlet 20. A seal 23 is provided between the lower end of the cylindrical screen 10 and the annular stationary shell 15a.

In the base is a support piping 15 leading from both radial directions to a center tee 16a supporting the central inlet tube 16. The tube is concentric with the screen 10 and supports the screen at its upper end. Stock is supplied through fittings 14 and 17 at the sides of the housing and flows inwardly up through the center of the tube 16 to be distributed by an annular distributor head 18. As the stock is distributed at the upper end, it flows downwardly through the center of the cylindrical screen 10, and the rejects flow as indicated by the arrowed lines 21 to a coarse fraction outlet shown schematically by the arrow 22. The fine fraction flows through the screen and down as indicated by the arrow 19a.

For obtaining the improved movement of the stock and improved fractionating screening effect, the stock is discharged as an umbrella jet at the slice opening 30 and turned in a spiralling centrifugal action along the inner surface of the screen.

As shown in FIG. 1, but primarily as shown in FIG. 2, at the upper end of the structure the stock flows upwardly through the center tube 16 and out through radial openings 26 into a cap structure 28 mounted at the upper end of the tube 16. The cap structure is an upwardly facing cup-shaped annular unit having radial openings 27 through which the stock flows from the tube 16, and the stock exits radially outwardly over an annular lower slice lip 29. The lower slice lip coacts with an upper slice lip 35 to provide the circumferential slice opening 30. As the stock flows radially outwardly through the slice opening 30, it impinges upon a series of circumferentially spaced spiralling deflector vanes 36, FIGS. 2 and 3. These vanes are supported on the circumferential outer flange 45 which is part of the annular distribution head 18, the position of which determines the size of the slice opening 30. The vanes 36 are rigidly supported and located so that the stock impinges thereon and they have a shape to direct or deflect the stock in a spiral flow path down along the inner surface of the cylindrical screen 10. An expansible connection 37 is located between the screen 10 and the flange member 45 to allow for vertical movement of the head 18 relative to the screen 10.

The stock is delivered to the mechanism by a controllable pressure or output delivery pump 46, FIG. 1, and the radial velocity of the stock exiting through the slice opening 30 is controlled by varying the pressure of stock delivered to the mechanism which varies the pressure of the stock in the inlet chamber 28a of the cup-shaped member 28. The volume is controlled by varying the size of the slice opening 30 which is varied by the position of the upper slice lip 35. The slice lip can be moved up and down by vertically positioning the head 18 by turning a handwheel 41. The head includes the head member 33 which supports the annular flange 45, and which slides vertically against the cap 31. The cap 31 has a smooth cylindrical outer surface 32 to receive O-ring seals 34 carried on the head member 33.

The head member 33 includes a flanged collar 42 which moves freely vertically on a vertical post 43 threaded at 44 into the top of the cap 31. The post 43 is threaded at its upper end to receive the rotatable handwheel 41. The handwheel bears down on a cup 40 which presses down on an annular ring 39 that bears on the top of a pneumatic actuator 38. The actuator 38 is air inflated and may be a continuous annular doughnut or a plurality of inflatable members that apply a downward biasing force against the head member 33 holding the flange 42 of the collar 42a against the top of the ring 39. As the handwheel 41 is tightened, a downward pressure is applied by the cup 40 and ring 39 against the pneumatic actuator 38 to urge the head member 33 downwardly to urge the upper slice lip 35 downwardly to tend to close the slice opening. The pneumatic backing accommodates sudden surges in liquid pressure to temporarily force the head upwardly to open the slice opening 30. The pneumatic actuator 38 can be collapsed by deflation for quickly opening the slice opening for unblocking. Also, the pressure in the actuator 38 can be varied to control the slice opening size and can be regulated in relation to the pressure of the stock being delivered by the pump 46. The volume of stock delivered into the screening chamber is varied by varying the size of the slice opening.

In operation, the stock is delivered to the screening mechanism by the pump 46 through inlets 14 and 17 and flows up through the central tube 16. At the top end of the tube, the stock flows through the radial openings 26 and 27 and out through the annular slice lip 30. The stock impinges on the spiralling deflector vanes 36 and is sent downwardly along the inner surface of the screen in a spiral path which improves the screening effect. Increased velocity and increased centrifugal action is achieved by increasing the delivery pressure of the pump 46. Increased flow volume is achieved by opening the slice opening 30 to a greater size.

The structure is simplified in arrangement requiring few elements, and requiring a minimum amount of machining. The structure utilizes standard structures for components such as a vertical tube 16 and simple castings for the head, requiring a minimum amount of machining such as the cylindrical surface 32 for the cap, and the slice lip surfaces 29 and 35. The structure is made so that it can be readily pulled apart by pulling up the head 18 with the screen, and the housing is constructed at its upper end to permit this action.

Thus, it will be seen that I have provided an improved fractionating and scalping screen which accomplishes the advantages and features above set forth and is capable of continued operation without frequent attention and cleaning.

I claim as my invention:

1. A centrifugal pulp screening device comprising in combination:

a vertically oriented perforate wall cylindrical screen having screen openings therein;

an outer enclosing housing for containing fiber accepts passing through the screen openings from stock within the screen;

a concentric centrally located stock supply conduit having an annular discharge at the upper end of the screen with a lower slice lip;

an upper annular slice lip defining a radially facing slice opening with the lower lip for the discharge of stock to the interior of the screen;

means directing the flow of stock in a spiral direction within the screen;

means at the lower end of the housing for withdrawing reject material not passing through the screen openings;

and adjustable means for adjustably moving said upper lip for controlling the size of the slice opening and the centrifugal movement of stock through the center of the screen.

2. A centralfugal pulp screening device constructed in accordance with claim 1:

wherein said directing means includes deflector vanes positoned at the upper end of the screen on the inner surface thereof angled to induce a sprial flow of stock along the inner surface of the screen as the stock emits from the slice opening and engages the vanes.

3. A centrifugal pulp screening device constructed in accordance with claim 1:

wherein said stock supply conduit extends concentrically from the lower to the upper end of the screen and has radial discharge openings leading from the conduit to an annular space formed adjacent to and in communication with the slice opening.

4. A centrifugal pulp screening device constructed in accordance with claim 1:
said adjustable means including a pneumatic actuator biasing the upper slice lip with adjustment means for limiting the movement of the upper slice lip to control the size of the slice opening.

5. A centrifugal pulp screening device constructed in accordance with claim 1:
said directing means including a plurality of circumferentially spaced spiralling deflector vanes mounted at the upper end on the inner surface of the screen positioned opposite the annular slice opening for spiralling the flow of stock emitted from the slice opening.

6. A centrifugal pulp screening device comprising in combination:
a vertically oriented perforate wall cylindrical screen;
an outer enclosing housing for containing fiber accepts passing through the screen from stock within the screen;
a centrally located stock supply conduit;
a stock distribution head coaxially mounted on said stock supply conduit at the upper end of the screen receiving stock from the conduit and including a lower cup-shaped slice lip having an annular central head;
an upper slice member sldiably located on the head and having an upper lip coacting with the lower lip to provide a continuous annular radially opening slice opening; a pneumatic actuator biasing said upper slice member into an open position;
a threaded bolt extending upwardly from the head with an adjustment wheel for controlling the size of the slice opening;
and means at the lower end of the housing for withdrawing reject material not passing through the screen.

7. A centrifugal pulp screening device comprising in combination:
a vertically oriented perforate wall cylindrical screen;
an outer enclosing housing for containing fibers passing through said screen from stock within said screen, angled sprial vanes at one end of the screen;
an upper slice member;
a centrally located stock supply means including a conduit having an annular discharge at the upper end of conduit having an annular discharge at the upper end of said screen and a lower slice member in vertically spaced relation to said upper slice member, the space between said slice members providing an annular slice opening directing stock flow radially outwardly against the vanes for inducing a centrifugal screening flow along the inner surface of the screen;
and means at the lower end of the housing for withdrawing reject material not passing through the screen.

8. A centrifugal pulp screening device constructed in accordance with claim 7:
including means for controlling the size of the slice opening to control the volume of flow against the vanes.

9. A centrifugal pulp screening device constructed in accordance with claim 7:
including means for controlling the pressure of stock delivery to the slice opening to controllably change the velocity of flow against the vanes and thereby change the centrifugal spiralling action of the stock along the screen.

10. A method of screening pulp stock in a device which has a cylindrical screen, an annular outwardly directed slice for discharging stock at one end of the screen to be impacted by stock flowing out through the slice, and vanes located in close proximity to the discharge end of said slice, the steps comprising:
varying the size of the slice opening to control the volume of flow against the vanes.

11. A method of screening pulp stock in a device which has a cylindrical screen, an annular outwardly directed slice for discharging stock at one end of the screen, and spiralling vanes positioned at the end of the screen to be impacted by stock flowing out through the slice, comprising the steps
controlling the pressure of flow through the slice opening to controllably affect the centrifugal spiralling action induced in the stock as it impacts the vanes and flows along the inner surface of the screen.

12. A centrifugal pulp screening device comprising in combination:
a vertical perforate wall cylindrical screen;
an outer enclosing housing for containing fibers passing through said screen from stock within said screen;
a centrally located stock supply means including a conduit having an annular discharge at the upper end of said screen;
said stock supply means further including a fixed slice lip and a movable slice lip; and
an adjustable actuator for the movable slice lip including a pneumatic means biasing said slice lip toward an open position;
a screw threaded device limiting the movable slice lip in opposition to said pneumatic means; and
inducing means inducing a spiral flow of the stock along the inner surface of said screen as it flows from the upper to the lower end thereof;
and means at the lower end of the housing for withdrawing reject material not passing through the screen.

13. A centrifugal pulp screening device according to claim 12 in which:
said inducing means includes spiralling vanes at the upper end of the screen for inducing a spiral flow of the stock along the inner surface of the screen.

* * * * *

UNITED STATES PATENT AND TRADEMARK OFFICE
CERTIFICATE OF CORRECTION

PATENT NO. : 4,462,900
DATED : July 31, 1984
INVENTOR(S) : John B. Matthew

It is certified that error appears in the above-identified patent and that said Letters Patent is hereby corrected as shown below:

Column 4, line 56, claim 2, change "centralfugal" to --centrifugal--.

Column 5, lines 54-55, claim 7, delete "conduit having an annular discharge at the upper end of."

Signed and Sealed this

Twenty-seventh Day of November 1984

[SEAL]

Attest:

GERALD J. MOSSINGHOFF

Attesting Officer

Commissioner of Patents and Trademarks